Nov. 24, 1925.

W. W. GARRIOTT

VEHICLE WHEEL

Filed Oct. 31, 1924

William W. Garriott
INVENTOR

BY Victor J. Evans
ATTORNEY

WITNESS:

Nov. 24, 1925.
W. W. GARRIOTT
VEHICLE WHEEL
Filed Oct. 31, 1924
1,562,696
2 Sheets-Sheet 2
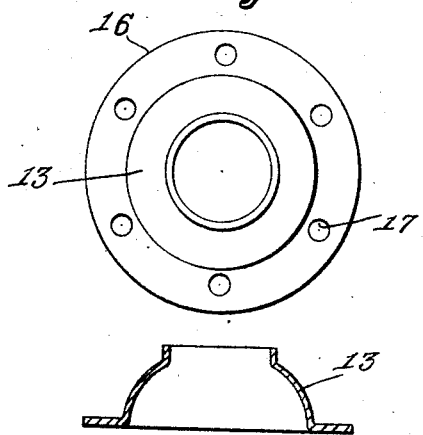
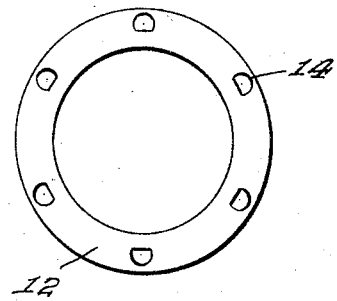
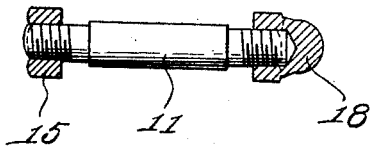
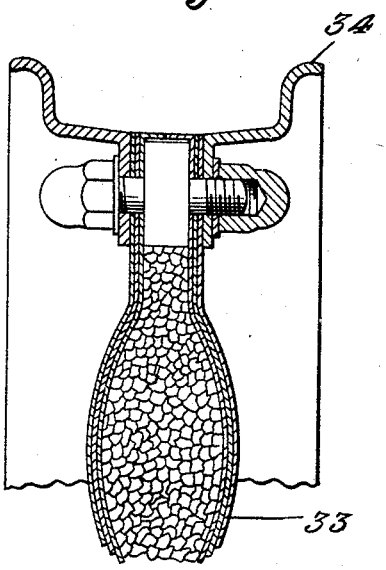
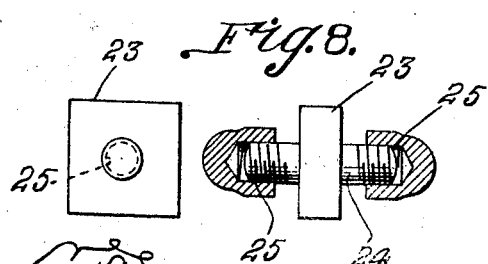
William W. Garriott
INVENTOR
BY Victor J. Evans
ATTORNEY Patented Nov. 24, 1925.

1,562,696

UNITED STATES PATENT OFFICE.

WILLIAM W. GARRIOTT, OF SEATTLE, WASHINGTON.

VEHICLE WHEEL.

Application filed October 31, 1924. Serial No. 747,095.

*To all whom it may concern:*

Be it known that I, WILLIAM W. GARRIOTT, a citizen of the United States, residing at Seattle, in the county of King and State of Washington, have invented new and useful Improvements in Vehicle Wheels, of which the following is a specification.

This invention relates to vehicle wheels and to that type known as disk steel.

The primary object of the invention is to provide a disk wheel that is insulated from heat created by friction and otherwise with the result that the disk plates thereof are prevented from becoming overheated thereby preventing crystallization and the like and resulting in a long life.

A further object is to provide a disk wheel construction provided with two or more spaced disks insulated in such a manner that the insulating material gives with the deflection of the plates and thereby provides a shock absorbing means to prevent vibration and to produce a silent wheel.

A still further object is to provide a disk wheel construction in a manner whereby either side can be applied to a vehicle hub.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 5 is a detail view of one of the hub guards in elevation and in section.

Figure 6 is a detail view of the other hub guard in elevation.

Figure 7 is a similar view of one of the bolt and nut connections.

Figure 8 is a view showing the disk separators in side and end elevation respectively.

Figure 9 is a modified form of wheel showing multiple disks.

Figure 4:
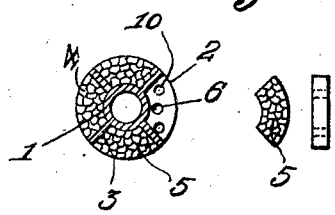
Figure 4 is a detail view of an auxiliary hub forming a part of the invention with the insulating pieces therefor.

Referring to the drawings in detail the vehicle hub A operatively associated with an axle B is shown for the purpose of illustrating the mounting of the wheel forming the subject matter of the present invention. Surrounding the hub A is an auxiliary hub 1 provided with spaced annular flanges 2 and cross flanges 3 forming compartments 4 between the flanges 2 and for receiving pieces of heat insulating material 5 such as cork and the like as clearly shown in Figure 4 of the drawings. The flanges 2 are provided with openings 6 to receive screws 7 for securing the disk plates 8 and 9 to the flanges which are further provided with openings 10 through which pass bolts 11 for receiving the hub guards 12 and 13 respectively which engage the disk plates through which also pass the bolts. The hub guard 12 which is arranged on the inner side of the hub is in the nature of a ring provided with openings 14 to receive the inner ends of the bolts 11 and this guard is secured to the bolts by flat nuts 15. The hub guard 13 is in the nature of a dust cap and is provided with a flange 16 formed with openings 17 to receive the outer ends of the bolts 11 and which is secured thereto by nuts 18 having rounded heads for the sake of appearance.

Figure 2:
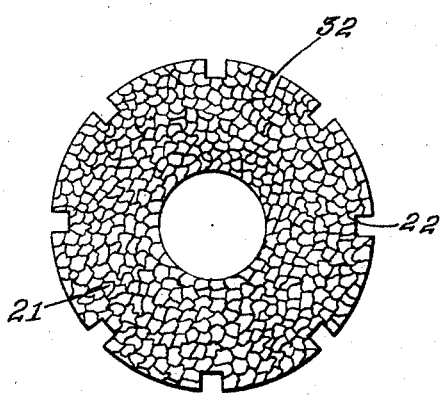
Figure 2 is a side elevation of the disk insulating material forming a part of the invention.
Figure 3:
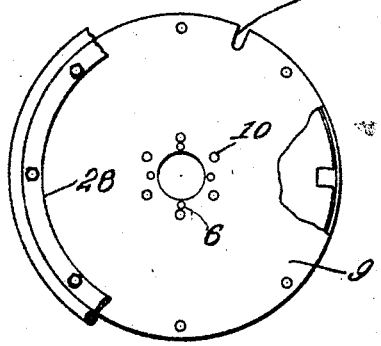
Figure 3 is a similar view of one of the disks showing parts broken away and a fragmentary portion of the tire receiving rim.

The disk plates 8 and 9 are curved inwardly from their connection with the flanges 2, thence outwardly then again inwardly to terminate in spaced parallel outer portions 19 which are provided with right angle disposed flanges 20 having their free edges engaging in confronting relation. Arranged between the flanges and having its side surfaces following the curvature thereof is a heat insulating disk 21 provided with peripherally arranged recesses 22 to receive the disk separators 23 through which pass a bolt 24 to provide threaded studs 25 arranged on each side of the separators as shown in Figure 8 of the drawings. The disk separators are arranged between the spaced portions 19 of the disk plates at spaced intervals as suggested by the arrangement of the recesses 22 in the insulating disk 21 as shown in Figure 2, and the right angle disposed portions 20 cover the outer face of the separators as shown.

Figure 1:
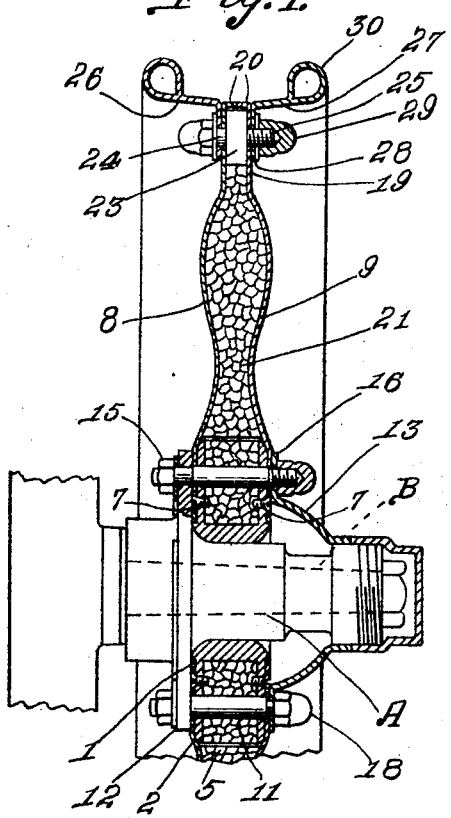
Figure 1 is a vertical sectional view through a fragmentary portion of a wheel constructed in accordance with the present invention.

The tire receiving rim of the wheel is formed by two parts 26 and 27 each of which are provided with inwardly extending flanges 28 provided with openings to be received by the threaded studs 25 and the rim parts are secured to the studs by nuts 29 having rounded heads. The rim parts as shown in Figure 1 are curved upon themselves to provide tire bead engaging flanges 30.

The disks are each provided with an elongated recess 31 registering with a like shaped recess 32 formed in the insulating disk 21 whereby a tire valve stem can pass therethrough as will be readily apparent. Flanges 28 are also provided with a like recess registering with the recess 31 and 32 for the purpose as above set forth.

A modified form of wheel is shown in Figure 9 of the drawings and the structure of this wheel is precisely the same as the one described with the exception that a plurality of disk plates 33 are adapted to reinforce the disk plates 8 and 9 of the preferred form. Of course any number of these disk plates may be provided without departing from the spirit of the invention. The tire receiving rim as shown in Figure 9 is provided with a conventional type of tire bead receiving flange 34.

From the drawings and the above description it will be apparent that the wheel forming the subject matter of the present invention is reversible that is, either side can be applied to the hub first, but of course the guards 12 and 13 must be arranged. The outer side of the guard 13 engages the threaded portion of the hub and terminates to provide a stop for the hub cap as shown.

The wheel may be assembled before it is applied to the hub or may be applied piece by piece beginning with the auxiliary hub.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A disk wheel of the character described comprising a flanged auxiliary hub, spaced disk plates secured thereto, a heat insulating disk secured between the disk plates, and a tire receiving rim secured to the outer edges of the disks.

2. A disk wheel of the character described comprising a flanged auxiliary hub, spaced disk plates having their inner ends secured thereto and terminating in spaced parallel outer portions, an insulator disk provided with peripherally arranged recesses formed therein and arranged between the spaced disk plates, separators arranged between the spaced parallel portions and disposed within the recesses, a bolt passing through the separators and provided with threaded studs extending from opposite sides thereof, and a tire receiving rim secured to the studs.

3. An insulated disk wheel of the character described comprising a hub, flanges extending therefrom, insulator pieces arranged between the flanges, spaced disk plates extending from the flanges and curved inwardly and thence outwardly upon themselves, an insulated disk received between the disk plates and having its outer surface following the curvature of the disk plates, a tire receiving rim secured to the disk plates, and said disk plates and insulator disk being provided with registering valve stem receiving recesses.

4. An insulated disk wheel of the character described comprising an auxiliary hub, spaced flanges rising therefrom, cross flanges arranged in the spaced flanges to provide compartments, an insulator piece receiving in each compartment, a plurality of spaced disks radiating from the flanges first mentioned, and terminating in spaced parallel outer portions, right angle disposed portions formed on the outer portions and having their edges engaging in confronting relation, and a tire receiving rim secured to the straight parallel portions.

5. The combination with a vehicle hub, of an insulated disk wheel therefor comprising an auxiliary hub surrounding the vehicle hub, a pair of spaced flanges extending from the auxiliary hub and provided with a plurality of registering openings, a plurality of spaced disk plates having their inner ends secured to the flanges and arranged in spaced relation with respect to each other, bolts passing through the registering openings, a hub guard in the nature of a dust cap secured to one end of the bolts and the hub guard in the nature of a ring secured to the opposite end of the bolts, heat insulating material arranged between the disk plates and flanges of the auxiliary hub respectively, and a tire receiving rim secured to the periphery of the disk plates.

In testimony whereof I affix my signature.

WILLIAM W. GARRIOTT.